United States Patent Office 3,311,806
Patented Mar. 28, 1967

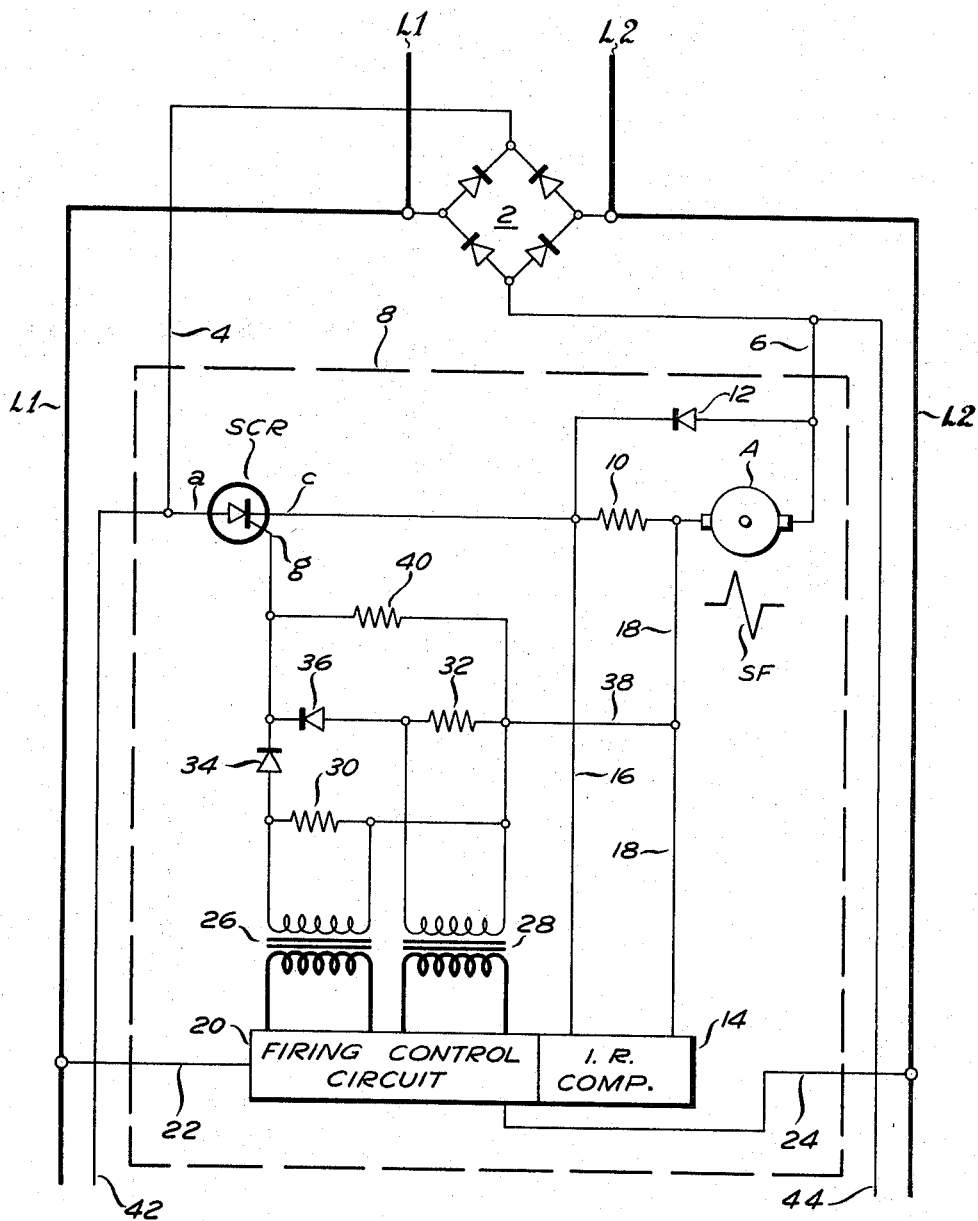

3,311,806
GATING DEVICE CONTROL MEANS
Reginald E. Charlwood, Menomonee Falls, Wis., assignor to Cutler-Hammer, Inc., Milwaukee, Wis., a corporation of Delaware
Filed June 4, 1963, Ser. No. 285,264
14 Claims. (Cl. 321—18)

This invention relates to gating device control means and more particularly to means for controlling electrical current conduction from a full-wave rectified alternating current source through a gating device of the type wherein current conduction is initiated by application of an electrical control signal and which continues to conduct to the end of the half-cycle of anode voltage.

While not limited thereto, the invention is especially applicable to controlled rectifier systems which are used to apply adjustable electrical power from a full-wave rectified source to one or more direct current load devices.

An object of the invention is to provide improved gating device control means.

A more specific object of the invention is to provide improved controlled-rectifier systems.

Another specific object of the invention is to provide improved means to insure turn-off of a controlled-rectifier at the end of each half-cycle of forward voltage applied thereto.

Another specific object of the invention is to provide improved means to insure turn-off of a controlled-rectifier at the end of each half-cycle of full-wave rectified forward voltage applied thereto.

Another specific object of the invention is to provide a controlled-rectifier which is supplied from a full-wave rectified source with improved means for applying a negative bias between the gate and cathode to insure termination of conduction at the end of each half-cycle of applied voltage in the event such applied voltage does not decrease to zero value.

Another specific object of the invention is to provide a controlled-rectifier which controls an inductive load from a full-wave rectified source with improved means for applying a negative voltage gate-to-cathode bias during both its conduction and non-conduction periods.

Another object of the invention is to provide in a direct current motor control system, wherein a controlled-rectifier controls energization of the motor from a full-wave rectified source, improved means providing an impedance such as a resistor for performing the plural functions of supplying a negative voltage gate-to-cathode bias to the controlled-rectifier during both its conduction and non-conduction periods and of supplying a signal for motor IR compensation purposes.

Other objects and advantages of the invention will hereinafter appear.

When a controlled-rectifier such as a silicon controlled-rectifier or SCR is switched to its conducting state by application of a gate-to-cathode signal, it continues to conduct like a thyratron until its forward or anode-to-cathode voltage is reduced to a low value. To turn off such controlled-rectifier, the conduction current must be reduced to a value sufficiently low, called the holding current, to allow the anode-cathode junction to assume a blocking state. There are several conditions under which a controlled rectifier might not turn off at the proper time although the gate signal has been terminated. If there is a positive line transient, the wave form of the applied forward voltage might not go through zero at the end of each half-cycle of a full-wave rectified supply and the controlled-rectifier might continue to conduct from one half-cycle to the next. Inequalities in components and load might cause phase-shift on successive half-cycles of applied voltage which could hold the controlled-rectifier on, particularly when a full-wave center tap supply transformer connection is used. If the controlled-rectifier does not turn off at the end of successive half-cycles, it cannot control the energization of the load.

According to the invention, a negative bias is applied between the gate and cathode of the controlled-rectifier to insure turn-off by increasing the value of holding current that would be required to keep the same conducting. That is, when negative bias is applied, the controlled-rectifier requires a larger holding current to keep it conducting; therefore, under normal conditions such negative bias will cause it to turn off. The gate of the controlled-rectifier is reverse biased, that is, subjected to a negative voltage relative to the cathode, by the load current during the time the controlled-rectifier is conducting by connection of a resistor of small ohmic value in series with its cathode and connection of the input signal circuit between the gate and load side of this resistor. The gate is continued in reverse bias during the time the controlled-rectifier is not conducting when the load is an inductive load such as a motor armature winding by the free-wheeling current flow in the same direction through such resistor and through a unidirectional current conducting device connected in reverse parallel relation with the series-connected armature winding and resistor. Preferably, the resistor of small value normally used for supplying an IR compensation feedback voltage is also used for applying the reverse bias to the gate of the controlled rectifier. Such negative bias or reverse bias has the additional advantage that it increases the $dv/dt$ or rate of voltage increase with respect to time withstanding capability of the controlled-rectifier. Since the holding current, that is, the minimum anode-cathode current required to maintain conduction, the gate energy required to fire the controlled-rectifier and the $dv/dt$ withstanding capability decrease with increasing temperature, the invention is particularly useful for maintaining control of controlled-rectifiers.

These and other objects and advantages of the invention and the manner of obtaining them will best be understood by reference to the following detailed description of an embodiment thereof taken in conjunction with the accompanying drawing, wherein:

The figure shows a schematic circuit diagram of gating device control means constructed in accordance with the invention.

Referring to the drawing, there is shown a controlled-rectifier system for controlling adjustable energization of an inductive load. The system is provided with rectifier means for supplying power thereto from an alternating current source. This means comprises a full-wave rectifier bridge 2 having its input terminals connected to power supply lines L1 and L2 which may be connected to such source. The positive and negative output terminals of bridge 2 are connected through conductors 4 and 6 to a controlled-rectifier and load circuit 8 enclosed in broken lines.

Circuit 8 is provided with a controllable gating device such as a silicon controlled-rectifier SCR for controlling an inductive load device such as armature A of a shunt-wound direct current motor. Positive conductor 4 is connected through the anode-cathode junction $a$-$c$ of controlled-rectifier SCR, a resistor 10 and the winding of armature A in series to negative conductor 6. Shunt field winding SF may be energized from a suitable direct current source. A unidirectionally conducting diode 12 is connected across armature A and resistor 10 and is poled to conduct in the direction from conductor 6 to the junction between resistor 10 and controlled-rectifier SCR.

Circuit 8 is provided with IR compensation means, that is, means to compensate for the IR (current-resistance) drop in the armature winding under variable load conditions thereby to maintain constant motor speed. This means comprises a compensation circuit 14 connected through conductors 16 and 18 to the opposite ends of resistor 10.

Circuit 8 is further provided with means for controlling firing of controlled-rectifier SCR. This means comprises a firing control circuit 20 supplied with alternating current from lines L1 and L2 through conductors 22 and 24. Firing control circuit 20 supplies the primary windings of a pair of transformers 26 and 28. Resistors 30 and 32 are connected across the secondary windings of transformers 26 and 28, respectively. The junction between the left-hand end of the secondary winding of transformer 26 and resistor 30 is connected through a unidirectionally conducting diode 34 to gate $g$ of controlled-rectifier SCR. In like manner, the junction between the left-hand end of the secondary winding of transformer 28 and resistor 32 is connected through a unidirectionally conducting diode 36 to gate $g$ of controlled-rectifier SCR. The other ends of the secondary windings of transformers 26 and 28 are connected through conductor 38 and a portion of conductor 18 to the junction between armature A and resistor 10. A resistor 40 has one end connected to gate $g$ and the other end connected between armature A and resistor 10.

Firing control circuit 20 may comprise a magnetic amplifier firing circuit, a unijunction transistor firing circuit or an electron tube firing circuit or the like which is capable of applying steep wave front pulses through transformers 26 and 28 on respectively alternate half-cycles of the supply voltage to the gate of controlled rectifier SCR and having means for adjustably shifting the phase of such pulses relative to the phase of the positive anode voltage or forward voltage of the controlled rectifier. The phase of the firing pulse determines the firing point of the controlled-rectifier on each 180 degree rectified half-cycle of the anode voltage and adjustment of such phase affords control of the amount of conduction of the controlled-rectifier to adjust the speed of the motor. Since such firing control circuits are known, the details thereof have not been shown to avoid complicating the drawing.

The IR compensation circuit 14 has also been shown schematically in the drawing since suitable circuits are known. For example, if a magnetic amplifier type firing control circuit is used, the compensation circuit may comprise a compensation control winding on the magnetic amplifier connected at one end to conductor 18 and at the other end through a relatively high resistor to conductor 16. Such compensation winding would be magnetically coupled to the magnetic amplifier windings to effect the proper compensation whenever the current flowing through resistor 10 varies under varying motor load conditions thereby to maintain motor speed constant. Such compensation consists of advancing or retarding the phase of the firing pulses relative to the controlled-rectifier anode voltage in proportion to increase or decrease, respectively, of the load current in resistor 10.

The operation of the system will now be described. Connection of a single-phase alternating current source to lines L1 and L2 causes a full-wave rectified voltage to be applied from rectifier bridge 2 through conductors 4 and 6 across the series circuit including controlled-rectifier SCR, resistor 10 and armature A. An alternating voltage is applied from lines L1 and L2 through conductors 22 and 24 to firing control circuit 20. Circuit 20 causes current pulses to flow in the primary windings of transformers 26 and 28 so that firing pulses are applied from the secondary windings thereof to gate $g$ of controlled-rectifier SCR on alternate half-cycles of the supply voltage.

When the left-hand end of the secondary winding of transformer 26 is made positive by a firing pulse, current flows therefrom through diode 34, the gate and cathode of controlled-rectifier SCR, resistor 10 and conductors 18 and 38 to the right-hand end of the secondary winding. Such firing pulse renders the controlled-rectifier conducting to cause current flow from conductor 4 through its anode and cathode, resistor 10 and the armature winding to conductor 6 to energize the motor armature. At a selected point of alternate half-cycles of the anode voltage, the left-hand end of the secondary winding of transformer 28 is made positive by a firing pulse. As a result, current flows therefrom through diode 36, the gate and cathode of the controlled-rectifier, resistor 10 and conductors 18 and 38 to the right-hand end of the secondary winding. This again causes current flow through the controlled-rectifier, resistor 10 and the motor armature. Controlled-rectifier SCR continues to conduct after each firing pulse to the end of the positive half-cycle of its anode voltage. When the anode voltage decreases to zero value, at the end of such half-cycle, the controlled-rectifier stops conducting.

It will be apparent from the foregoing, that the controlled-rectifier conducts for only the latter portion of each half-cycle of its anode voltage, that is, from the firing point to the end of the half-cycle. It will also be apparent that the controlled-rectifier does not, or should not, conduct during the first portion of each half-cycle of its anode voltage until a firing pulse is applied to its gate.

As hereinbefore mentioned, the controlled- rectifier might not stop conducting at the end of each half-cycle of its anode voltage. It is an essential feature of the invention to provide means which insure that the controlled-rectifier stops conducting at such points in its anode voltage wave. This means comprises the addition of a resistor of small value between the cathode of the controlled-rectifier and the inductive load and connection of the firing pulse circuit across the gate and such resistor rather than across the gate and cathode.

During the portion of each half-cycle of anode voltage when the controlled-rectifier conducts, the load current flows through resistor 10. The voltage drop across resistor 10 due to such load current flow is applied as a negative bias or reverse bias between the gate and cathode of the controlled-rectifier. This negative voltage or reverse bias is applied from the right-hand end of resistor 10 through conductors 18 and 38 and resistor 40 to the gate of the controlled-rectifier. Thus, when the firing pulse terminates, only the negative bias is applied to the gate to cause the controlled-rectifier to stop conducting at the end of each half-cycle of its anode voltage even if such anode voltage does not decrease all the way to zero value. After the controlled-rectifier stops conducting, the counter voltage of the armature winding causes current flow in the left-hand direction through diode 12 and in the right-hand direction through resistor 10. The voltage drop across resistor 10 due to such free-wheeling current flow continues the reverse bias on the controlled-rectifier as its anode voltage increases on the next half-cycle to insure that the controlled-rectifier remains non-conducting until the next firing pulse is applied to the gate. The firing pulse has a larger magnitude to overcome the negative bias and to fire the controlled-rectifier at the proper time.

Although the invention has been described as supplying the armature winding of a motor and utilizing the IR compensation resistor for reverse bias purposes, it will be apparent that when some other inductive or resistive load is supplied, a resistor of small value may be connected in the system to provide the reverse bias.

As shown in the drawing, rectifier bridge 2 may be connected through conductors 42 and 44 to supply additional circuits similar to circuit 8. In this manner, a plurality of load devices may be energized through respective controlled rectifiers from a single rectifier bridge. Also, as shown in the drawing, lines L1 and L2 extend downwardly past conductors 22 and 24 for connection to additional firing control circuits.

While the system hereinbefore described is effectively adapted to fulfill the objects stated, it is to be understood that I do not intend to confine my invention to the particular preferred embodiment of gating device control system disclosed, inasmuch as it is susceptible of various modifications without departing from the scope of the appended claims.

I claim:

1. In a control system for energizing a direct current load device from an alternating current power supply source:

a gating device of the type having an anode, a cathode and a control electrode and being responsive to application of a firing signal to its control electrode to conduct current in its anode and cathode circuit for the remainder of the half-cycle of its forward anode voltage regardless of any additional voltage or polarity thereof that may be applied to its control electrode;

rectifier means connected to said alternating current source to provide a supply of rectified voltage; means connecting said gating device in circuit with said rectifier means and a load device to said supply;

an impedance connected to the cathode of said gating device in said circuit whereby the load current flows through said impedance;

and means for applying a firing signal to the control electrode of said gating device at a selected point during a half-cycle of its forward anode voltage to cause said gating device to conduct current to the load device for the remainder of such half-cycle and including means for applying from said impedance a reverse bias voltage to said control electrode sufficient to cause said gating device to assume a current blocking condition at the end of such half-cycle by increasing the value of holding current that would be required to keep said gating device conducting.

2. The invention defined in claim 1, wherein said load device is an inductive load.

3. The invention defined in claim 1, wherein said gating device comprises a controlled-rectifier of the solid element type.

4. The invention defined in claim 1, wherein said rectifier means comprises a full wave rectifier bridge having its input terminals connected to said alternating current source and having its positive output terminal connected through the anode and cathode circuit of said gating device and said impedance and said load device in series in that order by said connecting means to its negative output terminal.

5. The invention defined in claim 4, wherein said firing signal applying means comprises means for applying a firing signal to said control electrode at a selected point during each half-cycle of the full-wave rectified forward anode voltage of said gating device.

6. The invention defined in claim 1, wherein said impedance is a resistor having small ohmic value and having one end connected to the cathode of said gating device.

7. The invention defined in claim 6, wherein said reverse bias voltage applying means comprises means connecting the opposite end of said resistor to said control electrode.

8. In a system for energizing an inductive direct current load device from an alternating current power supply source:

a full-wave rectifier bridge having its input terminals connected to said alternating current source;

a controlled rectifier and a small ohmic value resistor and a load device connected in series between the positive output terminal and the negative terminal of said rectifier bridge, the anode of said controlled rectifier being connected to said positive terminal and its cathode being connected to said resistor whereby full-wave rectified voltage is applied to the anode of said controlled rectifier, said controlled rectifier being of the type which responds to a firing signal at its gate to conduct current for the remainder of the half-cycle of positive anode voltage regardless of any other polarity of voltage at its gate;

and conduction control means connected to the gate of said controlled rectifier and to the junction between said resistor and said load device for applying positive voltage firing signals to said gate at a phase-adjustable point on the half-cycles of anode voltage and for also applying reverse bias voltage proportional to the load current flowing in said resistor to said gate sufficient to insure that said controlled rectifier ceases conduction at the end of each half-cycle of its anode voltage by increasing the value of holding current that would be required to keep said controlled rectifier conducting.

9. The invention defined in claim 8, together with a unidirectionally conducting diode connected across said inductive load and said resistor and being poled to pass current through said resistor in response to the induced voltage of said load during reduced conduction and non-conduction periods of said controlled rectifier whenever said induced voltage exceeds the corresponding applied voltage, said current flowing in said resistor in the same direction as the load current thereby to maintain a reverse bias voltage on said control electrode during said periods to insure turn-off of said controlled rectifier at the end of each said half-cycle.

10. The invention defined in claim 8, together with an IR compensation circuit connected across said resistor for applying a compensating feedback signal to said conduction control means.

11. In a system for energizing a plurality of inductive direct current load devices from an alternating current source:

a full-wave rectifier bridge supplied from said source;

a plurality of adjustably controllable circuits for controlling the energization of respective load devices, said circuits being supplied in parallel from the unidirectional output terminals of said rectifier bridge and each such circuit comprising:

a controlled rectifier for controlling energization of the respective load device;

conduction control means supplied from said source for applying adjustable-phase firing signals to said controlled rectifier during half-cycles of positive anode voltage thereof;

and means connected in said circuit for applying a small reverse bias voltage to said controlled rectifier sufficient to insure that it assumes a current blocking state at the end of each half-cycle of positive anode voltage.

12. The invention defined in claim 11, wherein said reverse bias voltage applying means comprises:

An IR compensation resistor connected between the cathode of said controlled rectifier and said load device;

a unidirectional conducting device connected across said resistor and said load device for conducting current through said resistor due to the induced voltage of the load during non-conduction periods of said controlled rectifier;

and means for applying a voltage proportional to such current flow in said resistor as a reverse bias to said controlled rectifier.

13. The invention defined in claim 12, wherein said last mentioned means comprises:

means connected to said conduction control means for applying a voltage proportional to the load current in said resistor as a reverse bias voltage to said controlled rectifier during conduction periods of the latter.

14. The invention defined in claim 7, wherein said means for applying a firing signal is connected across both the control electrode-cathode connection and said resistor.

References Cited by the Examiner

UNITED STATES PATENTS

| | | | |
|---|---|---|---|
| 3,176,212 | 3/1965 | DePuy | 321—18 |
| 3,191,112 | 6/1965 | Cain. | |
| 3,195,029 | 7/1965 | Gilbreath | 323—22 |
| 3,195,033 | 7/1965 | Jones | 307—88.5 |
| 3,210,605 | 10/1965 | Jones | 307—88.5 |
| 3,214,667 | 10/1965 | Foster et al. | 307—88.5 |

JOHN F. COUCH, *Primary Examiner.*

M. L. WACHTELL, *Assistant Examiner.*